United States Patent Office 3,418,344
Patented Dec. 24, 1968

---

3,418,344
17α-HYDROXYALKYL-17β-METHYLGONA-4,13-DIEN-3-ONES AND INTERMEDIATES
Edward A. Brown, Wilmette, Ill., assignor to G. D. Searle & Co., Chicago, Ill., a corporation of Delaware
No Drawing. Filed Dec. 29, 1966, Ser. No. 605,542
11 Claims. (Cl. 260—397.45)

ABSTRACT OF THE DISCLOSURE

Disclosed herein are pepsin-inhibiting and anti-biotic 17α - hydroxyalkyl-17β-methylgona-4,13-dien-3-ones and processes for preparing them from (a) 3-alkoxy-17α-hydroxyalkylestra-1,3,5(10)-trien-17β - ols via intermediate 3 - alkoxy - 17α - hydroxyalkyl - 17β - methylgona-1,3,5(10),13 - tetraenes and 3-alkoxy-17α-hydroxyalkyl-17β - methylgona-2,5(10),13-trienes, (b) 17α - hydroxyalkylandrost-5-ene-3β,17β-diols via intermediate 17α-hydroxy-alkyl-10,17β-dimethylgona-5,13-dien-3β-ols, or (c) 17β - hydroxyalkylandrost-4-en-3-ones, said intermediates being anti-hypercholesterolemic and anti-biotic.

---

This invention provides new, useful, and unobvious chemical compounds of the formula

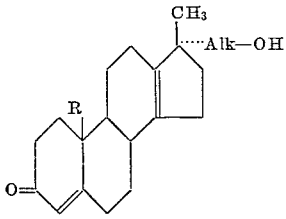

wherein R represents hydrogen or methyl and Alk represents alkylene. More particularly, Alk represents alkylene of lower order, which is to say methylene, ethylene, trimethylene, propylene, tetramethylene, 2-methyl-1,2-propylene, pentamethylene, 2,2 - dimethyl-1,3-propylene, or like bivalent, saturated, acyclic, straight- or branched-chain, hydrocarbon grouping of empirical formula $$-C_xH_{2x}-$$

wherein $x$ represents a positive integer less than 8. Among such lower alkylene groupings, those containing more than 1 and fewer than 5 carbon atoms are especially preferred.

The compounds to which this invention relates are useful by reason of their valuable pharmacological properties. For example, the above-enformulated compounds inhibit the proteolysis of hemoglobin by pepsin and are anti-biotic in respect of protozoa such as *Tetrahymena gelleii*, algae such as *Chlorella vulgaris*, and dicotyledenous seed germination. Moreover, the intermediates whence these compounds are hereinafter shown to be prepared share the aforesaid anti-biotic activity, and, in addition, are adapted to counteract exogenously-induced hypercholesterolemia.

Preparation of the compounds of this invention wherein no 10-methyl group is present proceeds by heating estratrienes of the formula

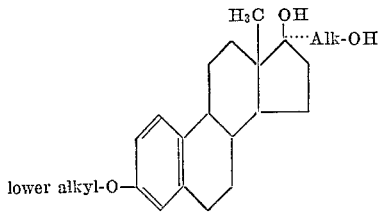

(wherein Alk is defined as before and the lower alkyl called for contains fewer than 8 carbon atoms) with ethanolic hydrochloric acid, thereby inducing rearrangement to the corresponding Δ¹³ unsaturated gonatetraenes

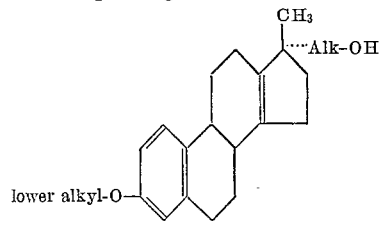

(wherein Alk and lower alkyl retain the meanings previously assigned). The latter compounds are reduced with lithium and liquid ammonia in tetrahydrofuran containing tert-butyl alcohol, and the resultant gonatrienes

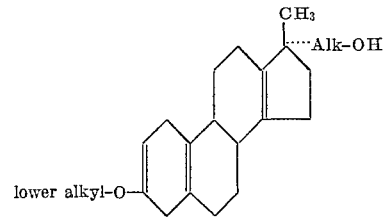

(wherein Alk and lower alkyl are defined as before) are converted to the 17α - hydroxyalkyl - 17β - methylgona-4,13-dien-3-ones of this invention upon prolonged contact with methanolic hydrochloric acid.

The 17α - hydroxyalkyl - 10,17β-dimethyl-4,13-dien-3-ones of this invention are prepared by converting androstenes of the formula

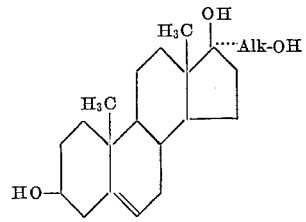

to gonadienes of the formula

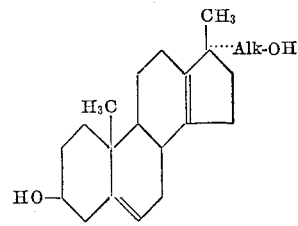

(Alk in the latter two formulas being defined as before) with hot ethanolic hydrochloric acid, esterifying the primary hydroxyls in the resultant compounds with pyridine and acetic anhydride, then subjecting the secondary hydroxyls to Oppenauer oxidation, and finally saponifying the ester linkages with warm aqueous methanolic potassium bicarbonate. Alternatively, the 17α - hydroxyalkyl-10,17β-dimethyl-4,13-dien-3-ones hereof are prepared by heating 17β - hydroxy - 17α-hydroxyalkylandrost-4-en-3-ones

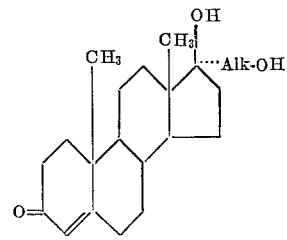

(Alk being defined as before) with ethanolic hydrochloric acid.

The following examples describe in detail compounds illustrative of the present invention and methods which have been devised for their preparation. However, the invention is not to be construed as limited thereby, either in spirit or in scope, since it will be apparent to those skilled in the art of organic synthesis that many modifications both of materials and of methods, may be practiced without departing from the purpose and intent of this disclosure. Throughout the examples hereinafter set forth, temperatures are given in degrees centigrade and relative amounts of materials in parts by weight, except as otherwise noted.

EXAMPLE 1

A. Ethyl 17β-hydroxy-3-methoxyestra-1,3,5(10)-trien-17α-ylacetate.—A mixture of 10 parts of 3-methoxyestra-1,3,5(10)-trien-17-one [estrone 3-methyl ether], 22 parts of ethyl bromoacetate, 14 parts of 20-mesh zinc, and 88 parts of benzene is stirred at the boiling point under reflux for 2 hours, then chilled. Zinc is filtered out and washed with benzene, the wash liquor being added to the filtrate. The resultant solution is stirred into an ice-cold mixture of 24 parts of concentrated hydrochloric acid and 500 parts of water, whereupon the benzene phase is separated and the aqueous phase extracted with ether. The ether and benzene solutions are combined, washed with water, dried over anhydrous sodium sulfate, and stripped of solvent by vacuum distillation. The oily residue, together with 8 parts of glacial acetic acid and 8 parts of (carboxymethyl)trimethylammonium chloride hydrazide, is heated at the boiling point under reflux for 30 minutes. The resultant solution is mixed with 12 parts of sodium bicarbonate dissolved in 400 parts of water. The precipitate thrown down is filtered off, washed with water, dried in air, and recrystallized from methanol to give ethyl 17β-hydroxy-3-methoxyestra-1,3,5(10)-trien-17α-ylacetate melting at 102–104°.

B. 17β-hydroxy-17α-(2-hydroxyethyl)-3-methoxyestra-1,3,5(10)-triene.—To a suspension of 21 parts of lithium aluminum hydride in 890 parts of tetrahydrofuran is added, during 15 minutes with agitation, a solution of 105 parts of ethyl 17β-hydroxy-3-methoxyestra-1,3,5(10)-trien-17α-ylacetate in 890 parts of tetrahydrofuran. The resultant mixture is heated at the boiling point under reflux with continued agitation for 4 hours, then hydrolyzed by slowly incorporating therein a solution of 20 parts of water in 20 parts of tetrahydrofuran, followed by 50 parts of water. Insoluble solids are filtered off and washed with tetrahydrofuran. The wash liquor is added to the filtrate, and the resultant solution is mixed with 10,000 parts of cold water. The precipitate thrown down is filtered off, washed with water, dried in air, and recrystallized from methanol to give 17β-hydroxy-17α-(2-hydroxyethyl)-3-methoxyestra-1,3,5(10)-triene melting at approximately 161°.

C. 17α-2(hydroxyethyl)-3-methoxy - 17β - methylgona-1,3,5(10),13-tetraene.—A mixture of 88 parts of 17β-hydroxy-17α-(2-hydroxyethyl)-3 - methoxyestra - 1,3,5(10)-triene, 106 parts of concentrated hydrochloric acid, and 280 parts of ethanol is stirred and heated at the boiling point under reflux for 45 minutes. Solution is complete after 15 minutes. Following the heating period, the reaction mixture is extracted with benzene; and the benzene extract is washed with water, dried over anhydrous sodium sulfate, and stripped of solvent by vacuum distillation. The oily residue is chromatographed on silica gel, using benzene and ethyl acetate as developing solvents. From an eluate comprising 10% ethyl acetate in benzene, upon evaporation of solvent and recrystallization of the residue from ethyl acetate, 17α-(2-hydroxyethyl)-3-methoxy-17β-methylgona-1,3,5(10),13-tetraene melting at 95–97° is obtained.

D. 17α-2-hydroxyethyl)-3-methoxy - 17β - methylgona-2,5(10),13-triene.—To a stirred solution of 25 parts of 17α - (2-hydroxythyl)-3-methoxy-17β - methylgona - 1,3,5(10),13-tetraene in a mixture of 1020 parts of liquid ammonia, 600 parts of tert-butyl alcohol, and 675 parts of tetrahydrofuran is added, during 10 minutes, 16 parts of lithium wire. After 2½ hours, 48 parts of methanol is cautiously introduced during 15 minutes. When the characteristic blue color has disappeared (representatively, after 15 minutes longer), the ammonia is allowed to evaporate and 1500 parts of water is thereupon added, continuous stirring being maintained thuoghout. Non-aqueous solvents are next removed by vacuum distillation. The precipitate which forms in the distilland is filtered off, washed with water, and dried in air. The product thus isolated is 17α-(2-hydroxy ethyl)-3-methoxy-17β-methylgona-2,5(10),13-triene.

E. 17α-(2-hydroxyethyl)-17β-methylgona-4,13-dien - 3-one.—To a solution of 8 parts of 17α-(2-hydroxyethyl)-3-methoxy-17β-methylgona-2,5(10),13-triene in approximately 60 parts of methanol is added approximately 7 parts of concentrated hydrochloric acid and 6 parts of water. The resultant mixture is allowed to stand for 2 hours at room temperature, then diluted with 400 parts of water. The precipitate which forms is isolated by filtration, washed with water, dried in air, and recrystallized from a mixture of benzene and hexane to give 17α-(2-hydroxyethyl)-17β-methylgona-4,13-dien-3-one melting at 110–115°. The product has the formula

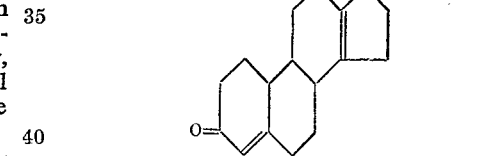

EXAMPLE 2

A. 17α-(3-hydroxypropyl)-3-methoxy-17β-methylgona-1,3,5(10),13-tetraene.—A mixture of 25 parts of 17α-(3-hydroxypropyl)-3-methoxyestra-1,3,5(10) - trien - 17β - ol (U.S. 2,913,467), 30 parts of concentrated hydrochloric acid, and 80 parts of ethanol is stirred and heated at the boiling point under reflux for 45 minutes. Solution occurs after 10 minutes. Following the heating period, 350 parts of cold water is introduced. An oil is thrown down, which solidifies upon cooling to around 5°. The solid is separated by filtration, washed with water, dried in air, and consecutively recrystallized from ethyl acetate and acetone to give 17α-(3-hydroxypropyl)-3-methoxy-17β-methylgona-1,3,5(10),13-tetraene melting at 85–90°.

B. 17α-(3-hydroxypropyl)-3-methoxy - 17β - methylgona-2,5(10),13-triene.—Substitution of 25 parts of 17α-(3 - hydroxypropyl) - 3 - methoxy - 17β - methylgona-1,3,5(10),13-tetraene for the 17α - (2 - hydroxyethyl)-3-methoxy-17β-methylgona-1,3,5(10),13-tetraene called for in Example 1D affords, by the procedure there detailed, 17α-(3 - hydroxypropyl)-3-methoxy - 17β - methylgona-2,5(10),13-triene. Upon recrystallization from ethyl acetate, the product melts at 83–89°.

C. 17α-(3-hydroxypropyl) - 17β - methylgona - 4,13-dien-3-one.—Substitution of 8 parts of 17α-(3-hydroxypropyl)-3-methoxy-17β-methylgona-2,5(10),13 - triene for the 17α-(2-hydroxyethyl)-3-methoxy - 17β - methylgona-2,5(10),13-triene called for in Example 1E, and recrystallization of the product from ethyl acetate instead of a mixture of benzene and hexane, affords, by a procedure otherwise identical with that detailed in Example 1E, 17α-

(3-hydroxypropyl)-17β-methylgona-4,13-dien-3-one melting at 135–141°. The product has the formula

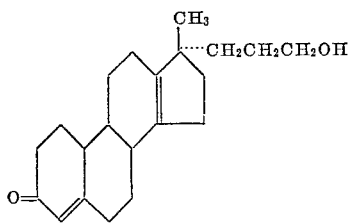

EXAMPLE 3

A. 17α-(2-hydroxyethyl) - 10,17β - dimethylgona-5,13-dien-3β-ol.—A mixture of 155 parts of 17α-(2-hydroxyethyl)androst-5-ene-3β,17β - diol (J. Chem. Soc., 1950, 2393), 180 parts of concentrated hydrochloric acid, and 480 parts of ethanol is stirred and heated at the boiling point under reflux for approximately 1½ hours. Solution is complete after about 80 minutes. Following the heating period, 1500 parts of water is introduced. The resultant mixture is allowed to stand for 18 hours while precipitation is completed. The precipitate is filtered off, washed with water, dried in air, and digested with 450 parts of boiling ethyl acetate. Insoluble solids are filtered out and recrystallized from ethyl acetate to give 17α-(2-hydroxyethyl)-10,17β-dimethylgona - 5,13 - dien-3β-ol melting at 163–168°.

B. 17α-(2-hydroxyethyl - 10,17β - dimethylgona-4,13-dien-3-one.—A mixture of 31 parts of 17α-(2-hydroxyethyl)-10,17β-dimethylgona-5,13-dien - 3β-ol, 20 parts of acetic anhydride, and 50 parts of pyridine is allowed to stand at room temperatures for 20 hours, whereupon 500 parts of water is introduced. The precipitate which forms is filtered off, washed with water, dried in air, and mixed with 30 parts of aluminum isopropoxide and 200 parts of cyclohexanone in 1675 parts of dry toluene. The resultant mixture is heated at the boiling point under reflux with agitation in a nitrogen atmosphere for 30 minutes, then chilled and diluted with approximately 200 parts of aqueous saturated Rochelle salt solution. The mixture thus obtained is steam distilled to remove non-aqueous solvents. The precipitate which separates in the distilland is taken up in 320 parts of warm methanol, and to the methanol solution is added approximately 200 parts of aqueous 5% potassium bicarbonate. The resultant mixture is allowed to stand at room temperatures for 24 hours, whereupon 2000 parts of water is introduced. The precipitate thrown down is separated and chromatographed on silica gel, using benzene and ethyl acetate as developing solvents. From an eluate comprising 40% ethyl acetate in benzene, on evaporation of solvent, 17α-(2-hydroxyethyl-10,17β-dimethylgona-4,13-dien-3-one is obtained as the residue. The product has the formula

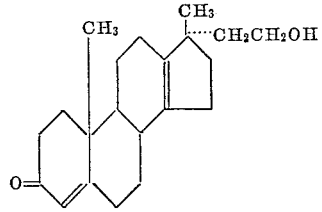

EXAMPLE 4

A. 17α-(3-hydroxypropyl)-10,17β-dimethylgona - 5,13-dien-3β-ol.—A mixture of 15 parts of 17α-(3-hydroxypropyl)androst-5-ene-3β,17β-diol (J. Org. Chem., 26, 3077 (1961)), 18 parts of concentrated hydrochloric acid, and 48 parts of ethanol is stirred and heated at the boiling point under reflux for 2 hours. Solution is completed after approximately 1½ hours. Following the heating period, 400 parts of water is introduced and the tacky precipitate thrown down is caused to firm up by chilling at 5° for 18 hours. The precipitate is then separated by filtration, washed with water, dried in air, and twice recrystallized from ethyl acetate to give 17α-(3-hydroxypropyl)-10,17β-dimethylgona-5,13-dien-3β-ol melting at 132–136°.

B. 17α-(3-hydroxypropyl)-10,17β-dimethylgona - 4,13-dien-3-one.—A mixture of 15 parts of 17β-hydroxy-17α-(3-hydroxypropyl)androst-4-en-3-one (J. Med. Chem., 6, 617 (1963)), 18 parts of concentrated hydrochloric acid, and 48 parts of ethanol is stirred and heated at the boiling point under reflux for 50 minutes, during which solution is completed. Approximately 300 parts of water is thereupon introduced, producing a precipitate which is extracted with benzene. The benzene extract is chromatographed on silica gel, using benzene and ethyl acetate as developing solvents. From an eluate comprising 40% ethyl acetate in benzene, upon evaporation of solvent, an oily material is obtained which is dissolved in 67 parts of methanol. To the methanol solution, approximately 21 parts of aqueous 2% potassium bicarbonate is added. The resultant mixture is allowed to stand for 5 hours at room temperatures, whereupon 420 parts of water is introduced. An oil separates, which is extracted with ether. The ether extract is washed with water, dried over anhydrous sodium sulfate, and stripped of solvent by distillation. The residue is 17α-(3-hydroxypropyl)-10,17β-dimethylgona-4,13-dien-3-one, having the formula

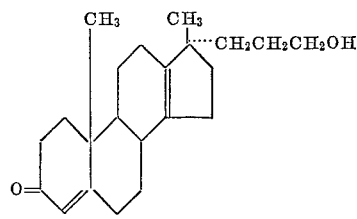

What is claimed is:
1. A compound of the formula

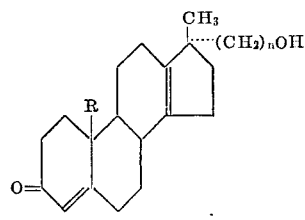

wherein R represents hydrogen or methyl and n represents a positive integer greater than 1 and less than 5.

2. A compound according to claim 1 wherein R represents hydrogen.

3. A compound according to claim 1 which is 17α-(3-hydroxypropyl)-17β-methylgona-4,13-dien-3-one.

4. A compound according to claim 1 wherein R represents methyl.

5. A compound according to claim 1 which is 17α-(3-hydroxypropyl)-10,17β-dimethylgona-4,13-dien-3-one.

6. A compound of the formula

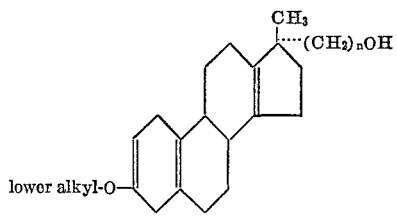

wherein *n* represents a positive integer greater than 1 and less than 5.

7. A compound according to claim 6 which is 17α-(3-hydroxypropyl) - 3-methoxy-17β-methylgona-2,5(10),13-triene.

8. A compound of the formula

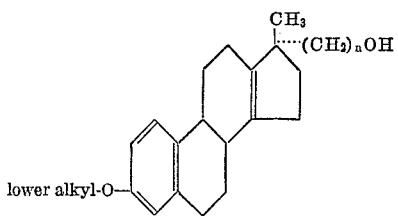

wherein *n* represents a positive integer greater than 1 and less than 5.

9. A compound according to claim 8 which is 17α-(2-hydroxyethyl) - 3-methoxy-17β-methylgona-1,3,5(10),13-tetraene.

10. A compound of the formula

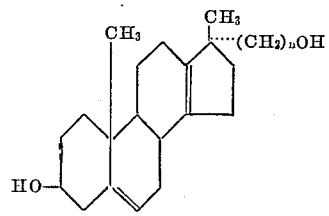

wherein *n* represents a positive integer greater than 1 and less than 5.

11. A compound according to claim 10 which is 17α-(2-hydroxyethyl)-10,17β-dimethylgona-5,13-dien-3β-ol.

References Cited

Ouannes, et al.: Bull. Soc. Chim. France, April 1964, pp. 776–782.

Chinn et al.: J. Org. Chem. 30, January 1965, pp. 257–259.

LEWIS GOTTS, *Primary Examiner.*

D. G. RIVERS, *Assistant Examiner.*

U.S. Cl. X.R.

71—67, 122; 167—65; 260—397.1, 397.5